United States Patent [19]

Ruzek

[11] Patent Number: 4,812,320

[45] Date of Patent: Mar. 14, 1989

[54] PROCESS FOR VACUUM PACKAGING FRESH MEAT PRODUCTS

[75] Inventor: David C. Ruzek, Austin, Minn.

[73] Assignee: Geo. A. Hormel & Co., Austin, Minn.

[21] Appl. No.: 188,191

[22] Filed: Apr. 28, 1988

Related U.S. Application Data

[63] Continuation of Ser. No. 859,701, May 5, 1986, abandoned.

[51] Int. Cl.⁴ .................... B65D 81/18; B65D 81/20
[52] U.S. Cl. ................................ 426/393; 426/129; 426/396; 426/414; 426/518
[58] Field of Search ............... 426/393, 396, 414, 518, 426/129

[56] References Cited

U.S. PATENT DOCUMENTS

| | | | |
|---|---|---|---|
| 2,136,041 | 11/1938 | Conn | 426/513 |
| 2,140,162 | 12/1938 | McKee | 426/518 |
| 2,255,796 | 9/1941 | Linane et al. | 426/513 |
| 2,776,215 | 1/1957 | Thomas | 426/396 |
| 2,776,216 | 1/1957 | Thomas | 426/396 |
| 2,812,260 | 11/1957 | Keane et al. | 426/513 |
| 2,917,388 | 12/1959 | Sullivan et al. | 426/518 |
| 3,060,036 | 10/1962 | Balbach | 426/513 |
| 3,108,883 | 10/1963 | Goeser | 426/518 |
| 3,193,392 | 7/1965 | Lundquist et al. | 426/124 |
| 3,397,068 | 8/1968 | Schaefer et al. | 426/396 |
| 3,491,504 | 1/1970 | Young et al. | 426/129 |
| 3,507,383 | 4/1970 | Rorer | 426/396 |
| 3,625,713 | 12/1971 | Mixon | 426/412 |
| 3,728,136 | 4/1973 | Langlands | 426/513 |
| 3,852,507 | 12/1974 | Toby | 426/513 |
| 4,036,997 | 7/1977 | Verburg | 426/513 |
| 4,072,763 | 2/1978 | Mart | 426/513 |
| 4,210,677 | 7/1980 | Huffman | 426/513 |
| 4,574,087 | 3/1986 | Sheehy et al. | 426/513 |
| 4,606,922 | 8/1986 | Schirmer | 426/415 |
| 4,683,139 | 7/1987 | Cheng | 426/265 |

FOREIGN PATENT DOCUMENTS

| | | | |
|---|---|---|---|
| 555219 | 4/1958 | Canada | 426/396 |
| 616819 | 3/1961 | Canada | 426/396 |
| 1281347 | 7/1972 | United Kingdom | 426/396 |

OTHER PUBLICATIONS

"Effect of Carbon Dioxide and Oxygen Enriched Atmospheres on the Shelf-Life of Refrigerated Pork Packed in Plastic Bags" by Miguel A. Asensio, Juan A. Ordonez and Bernabe Sanz.

"Wilson's TenderCuts" by Mark Lefens, *Meat Processing*, Jun. 1987, pp. 58-87.

"Retail Display Lighting Type and Fresh Pork Color", by C. R. Calkins, S. J. Goll and R. W. Mandigo, *Journal of Food Science*, vol. 51, No. 5, 1986, pp. 1141-1143.

"Meat Merchandising", *Meat Processing*, May 1987, pp. 58-62.

"The Use of Filter Paper to Stimate Drip Loss of Porcine Musculature", by R. G. Kauffman, G. Eikelenboom, P. G. van der Wal, G. Merkus and M. Zaar, *Meat Science*, 18 (1986), 191-200.

"Branded Beef-Product of Tomorrow-Today" by H. W. Meischen, Leader, D. L. Huffman, Cooperator, and G. W. David, Recorder, *American Meat Association*, pp. 37-46.

"Vacuum-Skin Packaging Beefs up Meat Shelf Life" by Barbara J. Knill, *Food & Drug Packaging*, vol. 52, No. 6, Jun. 1988 and pp. 4 and 34.

"Setting the Pace in Packaging Innovation", by Lawrence Watson, *Meat Processing*, Mar. 1988, pp. 24-26.

(List continued on next page.)

*Primary Examiner*—Steven Weinstein
*Attorney, Agent, or Firm*—Merchant, Gould, Smith, Edell, Welter & Schmidt

[57] ABSTRACT

The process for shaping and slicing primal meat cuts and then packaging the slices to increase the shelf-life thereof includes crust freezing the primal cuts to a depth of approximately ⅜ to ½ inch. The crust frozen primal cuts are then tempered for a period of time until the internal temperature reaches approximately 26°-28° F. and the tempered cuts are shaped in a molding press. The shaped primal cuts are then sliced, placed in a tray, and a gas pervious film is applied skin-tight to the slices and the upper surface of the tray. The packages are then frozen before shipment to retain outlets.

12 Claims, 2 Drawing Sheets

OTHER PUBLICATIONS

"Comparison of Vacuum and Modified Atmosphere Packaging" by Dr. J. M. Goepfert, Canada Packers Inc., *The National Provisioner*, Mar. 12, 1988, pp. 13–15.

"Effect of Loin Quality on Discoloration of Pork Chops During Retail Display", by G. C. Smith and Z. L. Carpenter, *J. Milk Food Technol*, vol. 39, No. 12, pp. 841–844.

"The Editor's Opinion: Challenging Retail Assumptions", *Meat and Poultry*, Mar. 1988, p. 6.

"VSP Ensures Quality of Portion–Control Meats", by Seymour Salett and Fran Labell, *Food Processing*, Feb. 1988, pp. 136–137.

"Case-Ready Port Nips" by Steve Marbery, Editor, *Hog Farm Management*, Dec. 1987, pp. 18–28.

"Debate Continues of Vacuum Packaging vs. CAP Approach" by James H. Bruce, Americal Lamb Council, *The National Porvisioner*, Nov. 7, 1976, pp. 18–20.

"New Approaches to Central Prepackaging Make It Workable" by George J. Cocoma, Wilson Foods Corporation, *The National Provisioner*, Nov. 2, 1987, pp. 58–63.

"Meat Industry Tackles Sagging Sales with New Products in Plastic Packaging" *DuPont Packaging Worldwide Trends in Product Packaging and Marketing*, vol. 8, 1987, i.e., DuPont de Nemours & Co. Inc.

"Excell Puts its Brand on Beef Line", *Advertising Age*, Oct. 5, 1987.

"Brand Loyalty Key to Successful Marketing of Fresh Meats" by Cal Andres, *Food Processing*, Oct. 1987, pp. 60–64.

"Retailers on Pork: Boneless and Vacuumed, Please", by Steve Bjerklie, Retail Connection, *Meat & Poultry*, Sep. 1987, p. 16.

"Vacuum Skin Packaging for Fresh or Frozen Foods", *Food Processing*, Jul. 1987, p. 107.

"Porkpacked with Shelf-Life", *Packaging Digest*, pp. 32–34.

"Plant Operations/Packaging", *Prepared Foods*, May 1987, p. 98.

"Controlled Atmosphere Keeps Food Fresh in Europe", *Packaging*, Feb. 1987, pp. 74–75.

"Our Industry Must make it 'In' to Eat Red Meat Again", by Dr. Patrick J. Luby, *The National Provisioner*, Nov. 23, 1985, pp. 62–76.

"Packaging has Rising Role in Red Meat's Turnaround" by John W. Allen and Thomas R. Pierson, *The National Provisioner*, Dec. 13, 1986, pp. 6–25.

"Panelists Report Success in Marketing Branded Red Meats", *The National Provisioner*, Oct. 25, 1986, pp. 100 and 102.

"Packaging Systems for Extending the Storage Life of Pork Cuts" *Journal of Food Science*, vol. 39 (1974), pp. 1140–1144.

"Systems for Centralized Prepackaging of Pork Loin Chops", *Journal of Food Science*, vol. 42, No. 6 (1977), pp. 1513–1521.

"Microbiology of Pork Packaged in Various Gas Atmospheres", by F. M. Christopher, C. Vanderzant, Z. L. Carpenter and G. C. Smith, *Journal of Food Protection*, vol. 42, No. 4, Apr. 1979, pp. 323–327.

"Meat Color of Pork Chops in Relation to pH and Adductor Capacitance of Intact Carcasses", by H. J. Swatland, University of Guelph, *Journal of Animal Science*, vol. 54, No. 2, 1982, pp. 264–267.

"Journal Paper No. J–10700 of the Iowa Agriculture and Home Economics Experiment Station", Ames, Iowa, Project No. 2515, *World Review of Animal Production*, vol. XVII, No. 3, Jul.–Sep. 1982, pp. 7–28.

"Two Weeks–A Shelf-Life Revolution in Fresh Meats" by Steve Bjerklie, *Meat Industry*, Sep. 1986, pp. 39–42.

"Boneless Pork-No Bones About It, the Majors are Attacking This Growing Market", *Meat Processing*, Mar. 1986, pp. 32–34.

"Evaluation of Some Objective Methods for Measuring Pork Quality" by C. Somers, P. V. Tarrant, and J. Sherington, *Meat Science*, 15 (1985), pp. 63–76.

"Technical Note: Oxygen Permeability at Sub-Zero Temperatures of Plastic Films for Vacuum Packaging of Meat" by A. E. Lambden, D. Chadwick and C. O. Gill, *Journal of Food Technology*, vol. 20 (1985), pp. 781–783.

"Palatability and Visual Acceptace of Dark, Normal and Pale Colored Porcine M. Longissimus" by D. G. Topel, J. A. Miller, P. J. Berger, R. E. Rust, F. C. Parrish, Jr. and K. Ono, *Journal of Food Science*, vol. 41, 1976, pp. 629–630.

"Applied Science and Engineering: Chemical, Palatability and Cooking Characteristics of Normal and Low Quality Pork Loins as Affected by Freezer Storage" by James D. Kemp, Richard E. Montgomery and J. D. Fox, *Journal of Food Science*, vol. 41, 1976, pp. 1–3.

(List continued on next page.)

OTHER PUBLICATIONS

"Microbiology of Pale, Dark and Normal Pork" by C. R. Rey, A. A. Kraft, D. G. Topel, F. C. Parrish, Jr. and D. K. Hotchkiss, *Journal of Food Science*, vol. 41, 1976, pp. 111–116.

"What Consumers Think About Red Meat–Now" by Dr. Roger W. Mandigo, *The National Provisioner*, Feb. 15, 1986, pp. 13–20.

"Microbial and Safety Implications of the Use of Modified Atmospheres to Extend the Storage Life of Fresh Meat and Fish" by Constantin A. Genigeorgis, *International Journal of Food Microbiology*, vol. 1 (1985), pp. 237–251.

"Longer Product Shelf Life Using Modified Atmosphere Packaging" *The National Provisioner*, Feb. 1, 1986, pp. 18–23.

"Uptime: The Control of Package Atmosphere: Where Is It Going in the U.S.? (Part 2)", *Food & Drug Packaging*, Jan. 1986, pp. 10, 14–18.

"Physical, Chemical, Sensory, and Microbiological Properties and Shelf Life of PSE and Normal Pork Chops" by J. D. Fox, S. A. Wolfram, J. D. Kemp and B. E. Langlois, *Journal of Food Science*, vol 45, 1980, pp. 786–790.

"CAP Will Dominate by End of Century, Speakers Say" *The National Provisioner*, Dec. 15, 1984, pp. 6–8.

"State-of-the-Art in Controlled Atmosphere Packaging of Fods" by Lawrence D. Starr, *The National Provisioner*, Dec. 15, 1984, pp. 9–11 and 23–24.

"Processed Meats, Where the Industry is Headed the Next 10 Years", *Meat Processing*, Sep. 1985, pp. 58–68.

"Is There Hope for Branded Fresh Meats?" by Katie Supinski, *Meat Industry* Mar. 1985, pp. 14–19.

"Is There Life for Meat at Retail?", *Meat Industry*, Mar. 1985, pp. 32–35.

"The Display Case: Copying with Conditions", *Meat Industry*, Mar. 1985, pp. 40 and 44–47.

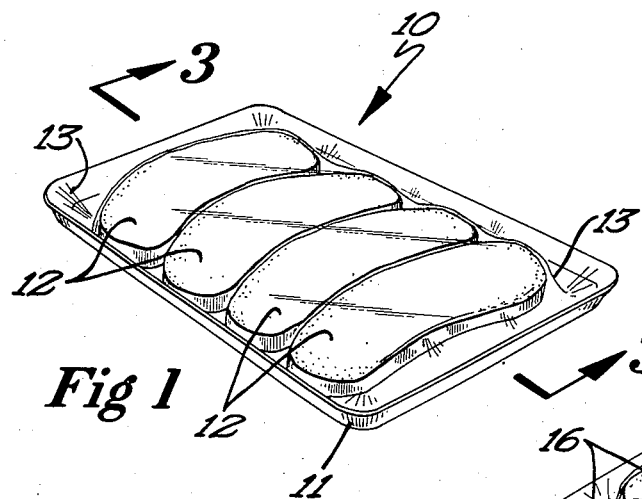
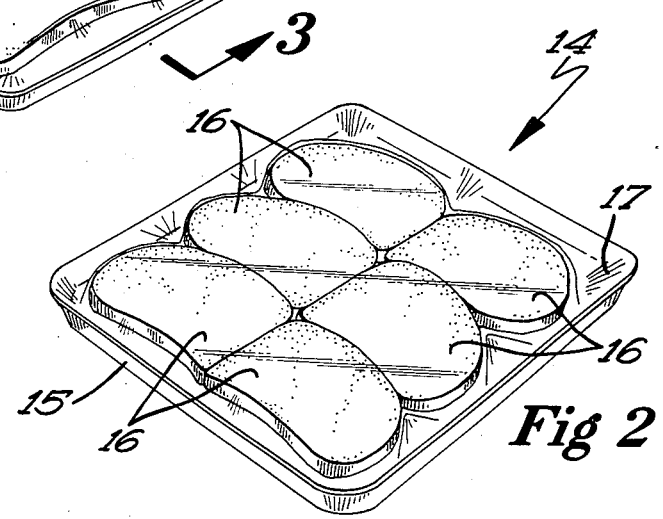
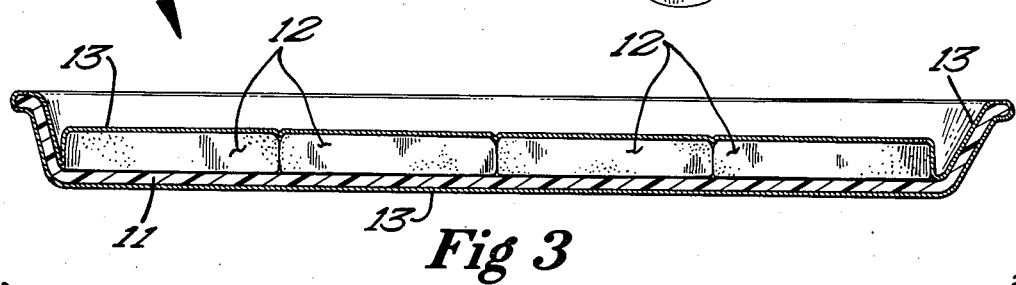
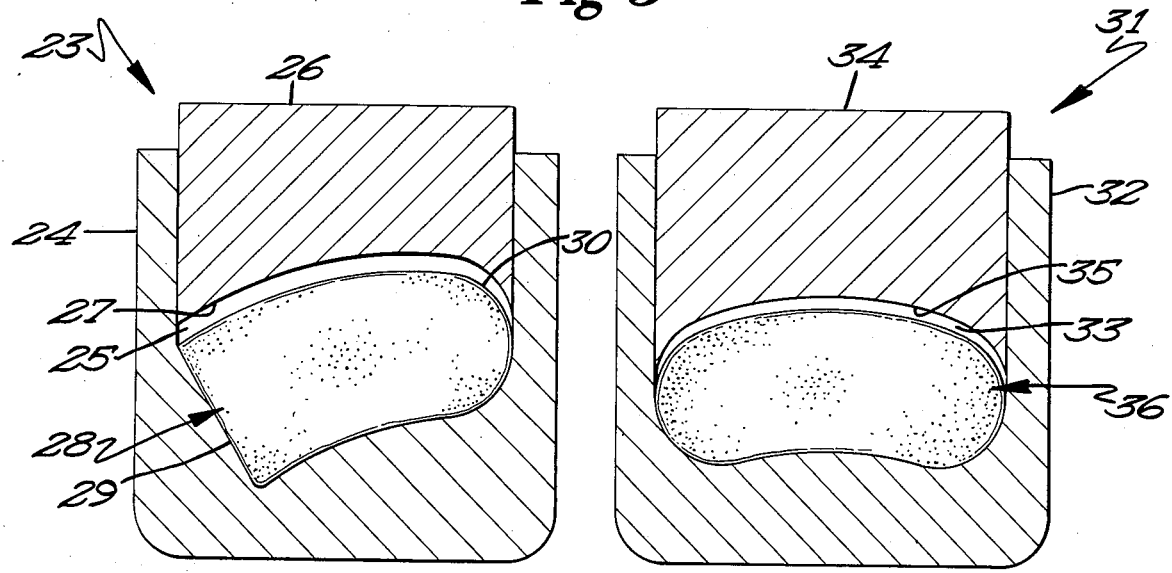

PROCESS FOR VACUUM PACKAGING FRESH MEAT PRODUCTS

This is a continuation of U.S. patent application Ser. No. 859,701, filed May 5, 1986, now abandoned.

This invention relates to a process for forming and packaging meat products.

BACKGROUND OF THE INVENTION

In the meat packing industry, various techniques are used in packaging fresh meat products. These fresh meat products may include primal or wholesale cuts and retail cuts. The primals may be vacuum packaged or gas flushed in a barrier bag at the plant level and then sold to the stores. The stores may then further process these primals into various cuts, place these cuts on styrofoam trays which are then overwrapped with a non-barrier film, and merchandise these trays in a refrigerated display case for prospective consumers.

Some of the problems associated with fresh meat products packaged in conventionally overwrapped trays are limited shelf-life, rapid discoloration, excessive purge, and lack of innovative packaging. Depending upon the temperature of the display case, overwrapped tray product can be expected to have a shelf-life of approximately three days. The product is generally considered no longer saleable after three days primarily because of discolorant which is due to rapid oxidation, light catalysis, and bacterial spoilage. In addition, product in overwrapped trays tends to display significant amounts of purge which is generally absorbed by soaker pads; this condition adds to the growth of microorganisms. Further, most conventional overwrapped trays are neither innovative nor especially attractive in appearance.

SUMMARY OF THE INVENTION

An object of this invention is to provide a novel process for forming and packaging meat products in which the slices of meat are positioned on trays and a non-barrier film is vacuum applied to the tray and meat in a manner so that the film is substantially skin-tight over the meat product, thereby substantially increasing the shelf-life of the meat product, prolonging an acceptable color to the product, eliminating space for weepage to occur in the package, and presenting a highly innovative and attractive package. In addition, the non-barrier film will allow off odors from microbiological spoilage of the meat to diffuse out of the vacuum package.

Another object of the invention is to provide trade benefits by reducing labor costs for the retailer and by increasing the variety of cuts available to the consumer.

These and other objects of the invention will now be more fully described.

FIGURES OF THE DRAWING

FIG. 1 is a perspective view illustrating a package of fresh meat product produced in accordance with the novel process;

FIG. 2 is a perspective view of a different meat cut produced in accordance with the novel process;

FIG. 3 is a cross-sectional view taken approximately along line 3—3 of FIG. 1 and looking in the direction of the arrows;

FIG. 4 is a diagrammatic view of one of the molding dies used to form or shape one of the meat cuts;

FIG. 5 is a diagrammatic view of a different form of molding die used in the novel process.

DESCRIPTION OF THE PREFERRED EMBODIMENT

Figure 6:
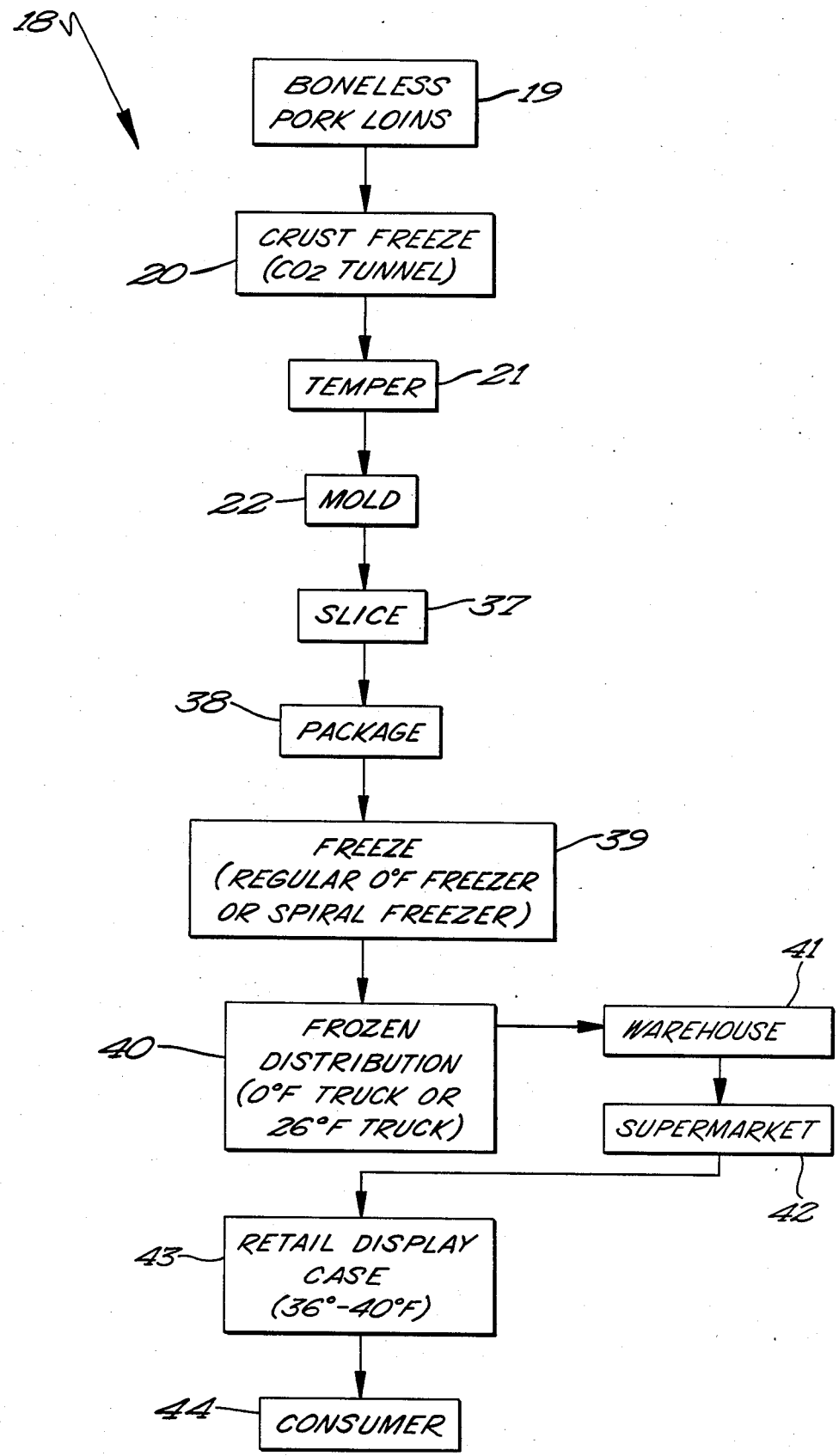
FIG. 6 is a block diagram illustrating the steps of the novel process.

Referring now to the drawings and, more specifically, to FIG. 1, it will be seen that one embodiment of a package of fresh meat slices, designated generally by the reference numeral 10, which has been prepared by the novel process, is thereshown. The package 10 includes a tray 11 having fresh meat slices or cuts 12 positioned thereon and covered in skin-tight relation by a film 13.

FIG. 2 illustrates another package of fresh meat slices, designated generally by the reference numeral 14, which also includes a tray 15 having slices or cuts of fresh meat 16 positioned thereon and covered in skin-tight relation by a film 17.

FIG. 3 is a cross-sectional view illustrating the skin-tight relation of the film which covers the meat slices. In this regard, it will be noted that the film engages all of those exposed surfaces of the meat and all of the upper exposed surfaces of the tray. Since the film is transparent, and adheres to the upper surface of the tray and to all exposed surfaces of the meat in skin-tight relation, a casual observer will not perceive the presence of the film, and the meat will appear as though it is positioned in uncovered relation on the tray.

Referring now to FIG. 6 of the drawing, it will be seen that a block diagram illustrating the various steps of the novel process, designated generally by the reference numeral 18, is thereshown. The novel process is directed to the formation and packaging of retail cuts which are sliced from shaped primal cuts. For example, the present process is used to produce thin or wafer chops, thick chops, and loin or rib chops from pork loins. The loins are selected from the 14/22 loin category and first boned and then cut and trimmed. It is preferred that the ham end of the loin be removed and that excess fat be trimmed in accordance with predetermined specifications. In some instances, the ham end may be included to provide a source for sirloin chops. In some instances, the pork loin or other primal cuts may be used without de-boning the loin so that bone-in chops or semi-boneless chops are produced by the process.

After the primal cut, such as a pork loin, has been cut, trimmed and/or boned, the loin is then transported to a $CO_2$ tunnel, such as those sold commercially by Cardox Corp. This apparatus comprises an elongate $CO_2$ tunnel having a conveyor belt extending therethrough. The loins or other primal cuts are placed as straight as possible on the conveyor belt and are moved through the $CO_2$ tube tunnel.

The temperature within the $CO_2$ tunnel is approximately $-70$ to $-90$ degrees Fahrenheit, and the loins are moved through the $CO_2$ tunnel within a period of 10 to 12 minutes. This residence time within the $CO_2$ tunnel causes the loins to be frozen to a depth of approximately $\frac{3}{8}$ to $\frac{1}{2}$ inch, while the remaining portion of the loin remains unfrozen. Thus, the loins are crust frozen as they are moved through the $CO_2$ tunnel 20.

After the loins have been crust frozen in the $CO_2$ tunnel, the loins are placed upon modified ham racks which are used in curing certain commercial hams, and are covered with large tote liners for sanitary reasons during transfer of the loins to a loin freezer. This is done as soon as possible to minimize any significant thawing of the crust frozen loins. Once the loins have been transferred to the loin freezer or tempering chamber, the tote liners are then removed or pulled upwardly on a rack to permit air to circulate through the rack and to allow the loins to temper quickly and effectively. The tempering step, designated by the reference numeral 21, takes place in the tempering chamber at a temperature of from about 24 to 28 degrees Fahrenheit for a period of approximately 8 to 12 hours.

It is preferred that the temper step immediately follow the crust freezing step. After tempering, the loins should have an internal temperature of 25-28 degrees Fahrenheit.

The tempered loins are then removed from the tempering chamber and are transported to the molds where the mold step, designated generally by the reference numeral 22, takes place. Pressing or molding may be done in a Bettcher Dyna-Form Model 75, manufactured by Bettcher Industries. Referring now to FIG. 4, it will be seen that one embodiment of the mold or press, designated by the reference numeral 23, is thereshown. The mold or press 23 includes a female die member 24 having a cavity 25 therein. A male die member 26 is movable in the female die member and has a concave lower die surface 27.

It will be noted in FIG. 4 that the loin 28 is shaped by the press 23 so that one side 29 of the loin is substantially flat, while the other side 30 is rounded. After the loin 28 has been molded and is thereafter sliced, it will produce the slice 16 illustrated in the package 14 of FIG. 2.

Referring now to FIG. 5, it will be seen that a different embodiment of the mold or press, designated generally by the reference numeral 31, is thereshown. The press 31 includes a female die 32 having a cavity 33 therein. A male die 34 is movable in the female die 32 and also has a concave lower surface 35. The loin 36, shaped by the mold 31, when sliced, produces a kidney-shaped slice corresponding to the slice 12 in the package 10 of FIG. 1. The sliced loins are then taken to the slicing station where the slicing step, designated generally by the reference numeral 37, takes place.

Temperature control of the shaped loins is essential in order to obtain the desired results. In this regard, the loins to be sliced should have an internal temperature of 28-30 degrees Fahrenheit.

The shaped loins may be sliced in any of the commercially available slicers commonly used in meat packaging plants. During the slicing operation, it is preferred that chops from the same loin be packaged together. It is also pointed out that the slicing step should not be done too far in advance of packaging because the sliced product will begin to discolor from the exposure to light, air and warmer temperatures.

After slicing, the sliced fresh meat is moved as quickly as it may conveniently be done to the packaging station where the packaging step, designated generally by the reference numeral 38, is accomplished. The packaging of the sliced fresh pork or other sliced whole meat product is packaged on a Cryovac VS 44 Mark II Machine, manufactured by W. R. Grace & Co. The trays 11 and 15 are formed from either 10 or 12 mil. barrier film, and the films 13 and 17 comprise a 4 or 6 mil. non-barrier film. The tray 11 is 5½ by 9¾ inches and the tray 15 is 8 by 9¾ inches. Both of the trays 11 and 15 are 5 mm. deep. It is pointed out that deeper trays will be used for roasts. It is pointed out that, because of the sensitivity and nature of the top films 13 and 17, the temperature of the slices to be packaged is critical. The optimum temperature range for the meat slices during packaging is 28-30 degrees Fahrenheit.

The films 13 and 17 are vacuum applied and adhere skin-tight to all exposed surfaces of the meat and upper surface of the trays, as illustrated in FIG. 3. This not only produces an extremely attractive appearance, but the skin-tight inter-engagement between the film and meat slice tray precludes the occurrence of purge or weepage. Since the covering film is non-barrier, gases which might be produced by organisms in and on the meat slices may pass outwardly through the skin, while oxygen may pass inwardly through the film. This arrangement contributes to the red bloom of the meat and allows noxious gases to escape from the package. Since the film adheres to the meat slices and upper surface of the tray in skin-tight relation, the packaged meat does not appear to be covered by a packaging material.

After the fresh whole meat slices have been packaged in either a package 10 or a package 14, the packaged product is labeled, boxed, and sent to a 0 degrees Fahrenheit freezer as soon as possible. The packaged products may be frozen in any suitable freezing process, such as blast chilling or the like. In this regard, it is essential that the fresh sliced meat product be promptly packaged, boxed, and frozen in order to maintain as much of the natural red meat color as possible. Since the molded product is relatively firm at packaging, these various packages can be stacked on top of each other in the conventional box. However, fresh meat products (such as center cut loin roasts, tenderloins and center cut butterfly chops) cannot be stacked immediately on top of each other since such stacked packages will have a tendency to produce a squeezing effect on the lower packages, so that the latter will appear flattened with noticeable amounts of purge squeezed out. After the product has been frozen in the 0 degree freezer during the freeze step 39, the product is ready for distribution.

The frozen boxed packages are then transported by truck to the customer's warehouse or other distribution point. It is preferred that the frozen product be transported in a 0 degree Fahrenheit truck or a 24-28 degree Fahrenheit truck. It is preferred that the product be retained in a frozen condition or at a temperature below 28 degrees Farenheit until it is ready to be placed in a store display. In this regard, the product will be thawed in a 34-38 degree Fahrenheit cooler prior to display in the refrigerated meat case. The product is typically displayed in a retain display case at a temperature of 34 to 40 degrees Fahrenheit. The consumer 42 may then select the desired package 10 or 14 from the display case for consumption.

It has been found that fresh meat slices packaged according to the present process remain stable and retain their red color for a period of 6 to 8 days after being placed in the retail display case. In this regard, freezing of the product after packaging locks in the red meat color (oxymyoglobin) and this assists in retaining the desirable red meat color while the product is in the display case.

A rest procedure was followed to determine the effectiveness of the present process in retaining the red color of the meat slices when compared to the color retention of slices packaged in accordance with conventional processes. In this test procedure, one group of meat slices (⅛ inch thick boneless pork chops) was formed and packaged pursuant to the Present Process.

These packages were placed in a 0 degree Fahrenheit freezer and remained there for 20 days. Thereafter, the packages were placed in a display case at 36-38 degrees Fahrenheit.

A second group of ⅛ inch chops were formed and packaged in the same manner as the first group. These packages, however, were further placed in a master barrier bag. A vacuum was drawn on the bag in a conventional manner. The master barrier bag (Vac Pak) was placed in a loin cooler for 24 hours at a temperature of 26 degrees Fahrenheit. The vacuum packaged chops were then removed from the loin cooler and placed in the second cooler for 20 days at 36 degrees Fahrenheit. Thereafter, the packages were removed from the master barrier bag and placed in a display case at 36 to 38 degrees Fahrenheit.

A third group of ⅛ inch boneless pork chops were formed and packaged in the same manner as the first and second groups. The packages were placed in a master barrier bag and the air was evacuated therefrom. A mixture of carbon dioxide and nitrogen was injected into the bag in accordance with a commercial gas flush packaging method (Gas Flush). The packaged slices were placed in a loin cooler for 24 hours at a temperature of 26 degrees Fahrenheit. Thereafter, the packaged boneless chops were removed from the loin cooler and placed in a second cooler for 20 days at a temperature of 36 degrees Fahrenheit. The gas flushed packaged chops were removed from the master bag and then placed in an R&D display case at 36 to 38 degrees Fahrenheit.

Loin portions were used in forming packages for overwrapped trays. The loin portions were vacuum packed in a barrier film and the packaged loins were placed in a loin cooler at a temperature of 26 degrees Fahrenheit for a period of 24 hours. The packaged loins were then removed and placed in a second cooler for 20 days at a temperature of 36 degrees Fahrenheit. Thereafter, these loins were cut into ⅛ inch cops and packaged in overwrapped tray (Overwrap) in the conventional manner. The overwrapped packages were then placed in a display case having a temperature of 36 to 38 degrees Fahrenheit.

The initial color of the packaged meat slices was recorded at the time the packages were placed in the display case. The color of the slices was assigned a numerical value in accordance with a color desirability scale. In the scale in Table 1, it will be noted that bright pink is the most desirable color, while pale and dark red are undesirable colors. The average rating of each group of meat slices was determined and recorded.

TABLE 1
COLOR DESIRABILITY
SCALE
1. PALE (NOT DESIRABLE)
2.
3. BRIGHT PINK (MOST DESIRABLE)
4.
5. DARK (NOT DESIRABLE)

| GROUP: | TREATMENT | AVERAGE RATING |
|---|---|---|
| #1: | OVERWRAP | 3.29 |
|  | PRESENT PROCESS | 2.86 |
|  | GAS FLUSH | 2.14 |
|  | VAC PAK | 2.14 |
| #2: | OVERWRAP | 2.29 |
|  | PRESENT PROCESS | 2.57 |
|  | GAS FLUSH | 1.57 |
|  | VAC PAK | 1.43 |
| #3: | OVERWRAP | 3.14 |
|  | PRESENT PROCESS | 3.43 |

TABLE 1-continued
COLOR DESIRABILITY
SCALE
1. PALE (NOT DESIRABLE)
2.
3. BRIGHT PINK (MOST DESIRABLE)
4.
5. DARK (NOT DESIRABLE)

| GROUP: | TREATMENT | AVERAGE RATING |
|---|---|---|
|  | GAS FLUSH | 3.00 |
|  | VAC PAK | 3.14 |
| #4: | OVERWRAP | 2.57 |
|  | PRESENT PROCESS | 2.43 |
|  | GAS FLUSH | 2.00 |
|  | VAC PAK | 1.57 |
| #5: | OVERWRAP | 3.43 |
|  | PRESENT PROCESS | 3.57 |
|  | GAS FLUSH | 4.00 |
|  | VAC PAK | 4.00 |

It will be noted in Table 1 that there is some variance in the initial average ratings for color, when comparing the same treatments from one group to another. However, this variance would be expected, since each group represents a different loin. In general, it appeared that the Overwrap product was closest to having the "most desirable" color during the initial evaluation, and was closely followed by the Present Process treatment. In Groups #1-4, the Gas Flush and Vac Pak treatments were considered somewhat more place than the other two treatments; they were considered somewhat more dark in Group #5. It was also noted that the Vac Pak treatments tended to have a slight yellowish cast to the fat.

These same packaged slices of meat were also observed on a daily basis to determine the color acceptability of the meat slices. The color acceptability was assigned a numerical value in accordance with an acceptable color, an unacceptable color, and a moderately off-color appearance, as shown in Table 2.

TABLE 2
COLOR ACCEPTABILITY
SCALE
1. ACCEPTABLE
2.
3. MODERATELY OFF-COLOR
4.
5. UNACCEPTABLE

| GROUP: | TREATMENT | AVERAGE RATING | |
|---|---|---|---|
|  |  | DAY 1 | DAY 2 |
| #1: | OVERWRAP | 1.57 | 1.75 |
|  | PRESENT PROCESS | 1.43 | 1.50 |
|  | GAS FLUSH | 2.71 | 3.00 |
|  | VAC PAK | 3.00 | 2.75 |
| #2: | OVERWRAP | 2.00 | 3.50 |
|  | PRESENT PROCESS | 2.14 | 3.25 |
|  | GAS FLUSH | 3.86 | 4.25 |
|  | VAC PAK | 3.86 | 4.00 |
| #3: | OVERWRAP | 2.00 | 4.00 |
|  | PRESENT PROCESS | 1.86 | 2.00 |
|  | GAS FLUSH | 3.14 | 3.50 |
|  | VAC PAK | 3.43 | 3.75 |
| #4: | OVERWRAP | 1.57 | 1.75 |
|  | PRESENT PROCESS | 2.57 | 2.25 |
|  | GAS FLUSH | 3.71 | 3.75 |
|  | VAC PAK | 3.86 | 4.00 |
| #5: | OVERWRAP | 2.00 | 2.25 |
|  | PRESENT PROCESS | 2.14 | 2.50 |
|  | GAS FLUSH | 2.71 | 3.50 |

TABLE 2-continued
COLOR ACCEPTABILITY

SCALE
1. ACCEPTABLE
2.
3. MODERATELY OFF-COLOR
4.
5. UNACCEPTABLE

| GROUP: | TREATMENT | AVERAGE RATING DAY 1 | DAY 2 |
|---|---|---|---|
| | VAC PAK | 3.14 | 4.00 |

After one day in the display case, Table 2 shows that the Overwrap product was still rated slightly better for color than the Present Process product, although the latter was also considered to be very acceptable. The Gas Flush and Vac Pak treatments were considered to be moderately off-colored. After two days, the color of the Present Process product remained relatively stable, whereas the Overwrap product started to show signs of discoloration. The Gas Flush and Vac Pak products were close to being unacceptable. Although it is not shown in Table 2, the color of the Present Process product remained fairly stable and acceptable for 6–8 days, depending upon the color of the loin to begin with (light or PSE muscle generally discolors faster than medium to dark colored muscle). The Overwrap product was generally considered to be unacceptable after 3–4 days, and the Gas Flush and Vac Pak treatments were terminated after two days. The yellowish cast on the Vac Pak product had darkened somewhat and, although considered to be generally unacceptable, remained stable for 8–10 days before turning yellowish-green.

The covering non-barrier film not only permits the exchange of gas through the film to assist in the maintenance of the red meat color, but the skin-tight application of the film to the meat and to the tray reduces purge and weepage which also contributes to the extended shelf-life. It has also been found that fresh meat slices packaged in accordance with the present process not only retain their red meat color for substantially longer periods of time than the conventionally packaged over-wrapped trays, but there is significantly less bacterial growth with the present process when compared to the conventional package.

The following table shows the log values of microorganisms on the meat surfaces on successive days in the display case.

TABLE 3
TOTAL BACTERIA COUNTS (LOG VALUES) PER GRAM

| DISPLAY CASE | OVERWRAP | PRESENT PROCESS | MASTER BAG | |
|---|---|---|---|---|
| | | | GAS | VAC PAK |
| INITIAL | 7 | 3 | 5 | 6 |
| CONDITION | 6 | 3 | 2 | 6 |
| OF PRODUCT | 6 | 2 | 4 | 6 |
| | 6 | 3 | 3 | 6 |
| | 8 | 1 | 7 | 7 |
| | 6.6 | 2.4 | 4.2 | 6.2 |
| DAY 1: | 6 | 3 | 3 | 6 |
| | 5 | 2 | 4 | 4 |
| | 6 | 1 | 5 | 6 |
| | 5 | 1 | 3 | 6 |
| | 7 | 1 | 6 | 8 |
| | 5.8 | 1.6 | 4.2 | 6.0 |
| DAY 2: | 6 | 3 | 3 | 6 |
| | 5 | 1 | 3 | 5 |
| | 6 | 2 | 4 | 6 |
| | 5 | 1 | 4 | 5 |
| | 6 | 1 | 6 | 7 |
| | 5.6 | 1.6 | 4.0 | 5.8 |
| DAY 5: | 6 | 2 | 5 | 6 |
| | 5 | 2 | 4 | 5 |
| | 6 | 4 | 5 | 7 |
| | 5 | 4 | 7 | 7 |
| | 7 | 3 | 7 | 8 |
| | 5.8 | 3.0 | 5.6 | 6.6 |
| DAY 7: | | 1 | | |
| | | 5 | | |
| | | 4 | | |
| | | 4 | | |
| | | 6 | | |
| | | 4.0 | | |

In another test procedure, overwrapped and VSP packaged products were compared for weight loss (purge) after six days in a refrigerated display case. All of the samples were processed from three matched pairs of boneless pork loins. The right pairs of loins were cut into ½ inch thick chops, which were placed on styrofoam trays, overwrapped, and placed in a refrigerated display case. The left pairs of loins were processed by the VSP method of crust freezing, tempering, molding, and packaging; the VSP packages were then frozen for one week, thawed, and placed in the same refrigerated display case that held the overwrapped product. The amount of purge in each package was determined in the following manner: the initial weight of each overwrapped and VSP package with product was recorded; after six days in the display case, the meat from each package was removed and weighed; the weight of the product plus the tare weight of the package was then subtracted from the initial weight of the package to determine the weight loss or purge from the chops. Table 4 shows that the overwrapped product experienced approximately 3.5 times the weight loss as the VSP counterparts. In addition, this study also reinforces the microbiology data presented earlier. Table 4 shows that the average bacterial count for the overwrapped product was at least one log higher than the VSP product; the higher pH for the overwrapped products is indicative of the larger number of putrefactive bacteria (such as Pseudomonads) growing on the meat surface.

TABLE 4
PURGE DETERMINATION

| MATCHED PAIR LOINS | MICRO CT/GM $10^6$ | pH | TBA | AVERAGE WEIGHT LOSS GMS* |
|---|---|---|---|---|
| OVERWRAP | | | | |
| 1L | | | | 7.58 |
| 1 | 91.0 | 5.85 | 0.12 | |
| 2 | 88.0 | 6.13 | 0.11 | |
| 3 | 102.0 | 6.30 | 0.09 | |
| 2L | | | | 5.25 |
| 1 | 92.0 | 5.97 | 0.18 | |
| 2 | 81.0 | 5.99 | 0.08 | |
| 3 | 71.0 | 6.26 | 0.08 | |
| 3L | | | | 3.78 |
| 1 | 40.0 | 6.28 | 0.07 | |

TABLE 4-continued

| MATCHED PAIR LOINS | PURGE DETERMINATION | | | |
|---|---|---|---|---|
| | MICRO CT/GM $10^6$ | pH | TBA | AVERAGE WEIGHT LOSS GMS* |
| 2 | 39.0 | 6.30 | 0.06 | |
| 3 | 130.0 | 6.64 | 0.04 | |
| Average | 81.6 | 6.19 | 0.09 | Total = 16.61 |
| VSP | | | | |
| 1R | | | | 1.47 |
| 1 | 15.0 | 5.77 | 0.05 | |
| 2 | 4.1 | 5.77 | 0.06 | |
| 3 | 7.0 | 5.68 | 0.08 | |
| 2R | | | | 1.17 |
| 1 | 1.16 | 5.67 | 0.05 | |
| 2 | 1.3 | 5.78 | 0.02 | |
| 3 | — | 5.70 | 0.01 | |
| 3R | | | | 2.16 |
| 1 | 0.27 | 5.77 | 0.10 | |
| 2 | 0.97 | 5.56 | 0.12 | |
| 3 | 0.78 | 5.66 | 0.08 | |
| Average | 3.82 | 5.71 | 0.06 | Total = 4.8 |

*Based on weight loss of product in each package from each loin.

Finally, it was found that a product packaged pursuant to the Present Process and displayed in a retail display case for a period of 6 to 8 days manifested no off odors upon opening of the package. It is believed that the non-barrier film permitted the noxious gases to readily escape, rather than accumulate within the package.

The present process is especially adapted to forming and packaging boneless ¼ inch wafer slices, ⅛ inch loin and rib slices, and 1 inch thick loin chops. It will be appreciated that primal cuts of meats, other than loins, may be used as the source of meat slices produced pursuant to the present process.

From the foregoing description, it will be seen that the novel process allows the production of a package of fresh sliced meat product, which not only has an extended shelf-life over conventionally packaged products, but also produces a package having high customer appeal.

Therefore, the present invention is directed to a process which permits fresh sliced whole meat products to be formed and packaged in a manner more efficient that any heretofore known comparable process.

What is claimed is:

1. A process for forming and packaging tray wrapped meat products to increase the shelf life of the products, prolong the color of the meat products, and minimize weepage, comprising:
    placing a primal meat cut in a low temperature zone having a temperature of approximately −70° to −90° F. for a period of approximately 10 to 12 minutes to freeze only the crust of the cut to a depth of approximately ⅜ to ½ inch,
    removing the crust frozen cut from the low temperature zone and immediately, in order to minimize thawing, placing the cut in a temperating zone having a temperature of approximately 24° F. to 28° F. for a period of approximately 8 to 12 hours until each cut is tempered and has an internal temperature of about 26° to 28° F.,
    placing the tempered cut in a molding press and molding each cut into a predetermined shape while maintaining the internal temperature of the cut at a temperature of about 26° F. to 28° F.,
    slicing the molded cut into slices of uniform predetermined thickness and similar shape while maintaining the internal temperature of the cut at a temperature of about 28° F. to 30° F. so that the cut is sliced when it is deep chilled,
    placing a predetermined number of deep chilled meat slices upon the upper surface of a specific size tray formed of gas impervious plastic film of predetermined thickness,
    applying a non-barrier film to the deep chilled meat slices and the tray to cover the deep chilled meat slices on the tray, while maintaining the temperature of the meat slices at approximately 28° F. to 30° F., so that gases produced by organisms in and on the meat slices may pass outwardly through the film, while oxygen may pass inwardly through the film, thereby aiding in the color retention and shelf life of the meat slices,
    vacuum skin packaging the covered deep chilled meat slices so that the non-barrier film adheres tightly to all exposed surfaces of the deep chilled meat slices and adheres tightly to all portions of the upper surface of the tray not covered by the meat slices, thereby eliminating space for purge or weepage to occur and creating the impression that the meat slices are not covered by any packaging material,
    placing
    a plurality of said vacuum skin packaged
    trays of meat slices into a box which is placed in a freezing chamber,
    transporting at least one box of meat slices at about 0° F. or at about 24° to 28° F., maintaining the product in a frozen condition or at a temperature below 28° F.,
    thawing the meat slices to a temperature of 34° to 38° F.,
    and placing
    said vacuum skin packaged trays containing said thawed meat slices in a retail display case at a temperature of 34° to 40° F. so that the meat slices retain their red color for a period of 6 to 8 days after being placed in the retail display case.

2. The process of claim 1 wherein the predetermined shape of each slice has a substantially straight first end and a rounded second end.

3. The process of claim 2 further comprising placing the slices in the tray in a predetermined position, wherein the straight end of a first slice abuts the straight end of a second slice, wherein the slices substantially fit the tray configuration.

4. The process of claim 1 wherein the predetermined shape of each slice is kidney-shaped and has a first conex side and a second concave side.

5. The process of claim 4, further comprising placing the slices in the tray in a predetermined position, wherein the concave side of the first slice abuts the convex side of the second slice, wherein the slices substantially fit the tray configuration.

6. The process of claim 1 wherein the specific size tray is 5½ by 9¾ inches and 5 mm. deep.

7. The process of claim 1 wherein the specific size tray is 8 by 9¾ inches and 5 mm. deep.

8. The process of claim 1 wherein each slice has a thickness of ¼ inch.

9. The process of claim 1 wherein each slice has a thickness of ⅛ inch.

10. The process of claim 1 wherein each slice has a thickness of 1 inch.

11. The process of claim 1 wherein the primal meat cut is a pork loin.

12. A process for forming and packaging tray wrapped meat products to increase the shelf life of the products, prolong the color of the meat products, and minimize weepage, comprising:

placing a primal meat cut which has been cut, trimmed and boned in a low temperature zone having a temperature of approximately −70° to −89° F. for a period of approximately 10 to 12 minutes to freeze only the crust of the cut to a depth of approximately ⅜ to ½ inch, removing the crust frozen cut from the low temperature zone and immediately, in order to minimize thawing, placing the cut in a temperating zone having a temperature of approximately 24° F. to 28° F. for a period of approximately 8 to 12 hours until each cut is tempered and has an internal temperature of about 26° to 28° F. wherein the crust frozen cut is covered for sanitary reasons while in transport from the low temperature zone to the temperating zone and wherein the crust frozen cut is uncovered after placement in the tempering zone, placing the tempered cut in a molding press and molding each cut into a predetermined shape while maintaining the internal temperature of the cut at a temperature of about 26° F. to 28° F., slicing the molded cut into slices of uniform predetermined thickness and similar shape while maintaining the internal temperature of the cut at a temperature of about 28° F. to 30° F. so that the cut is sliced when it is deep chilled, quickly placing a predetermined number of deep chilled meat slices upon the upper surface of a specific size tray formed of gas impervious plastic film of predetermined thickness, applying a non-barrier film to the deep chilled meat slices and the tray to cover the deep chilled meat slices on the tray, while maintaining the temperature of the meat slices at approximately 28° F. to 30° F., so that gases produced by organisms in an on the meat slices may pass outwardly through the film, while oxygen may pass inwardly through the film, thereby aiding in the color retention and shelf life of the meat slices, vacuum skin packaging the covered deep chilled meat slices so that the non-barrier film adheres tightly to all exposed surfaces of the deep chilled meat slices and adheres tightly to all portions of the upper surface of the tray not covered by the meat slices, thereby eliminating space for purge or weepage to occur and creating the impression that the meat slices are not covered by any packaging material, placing a plurality of said vacuum skin package trays of meat slices into a box which is placed in a freezing chamber, transporting at least one box of meat slices at about 0° F. or at about 24° to 28° F., maintaining the produce in a frozen condition or at a temperature below 28° F., thawing the meat slices to a temperature of 34° to 38° F., and placing said vacuum skin packaged trays containing said thawed meat slices in a retail display case at a temperature of 34° to 40° F. so that the meat slices retain their red color for a period of 6 to 8 days after being placed in the retail display case.

* * * * *

UNITED STATES PATENT AND TRADEMARK OFFICE
CERTIFICATE OF CORRECTION

PATENT NO. : 4,812,320

DATED : March 14, 1989

INVENTOR(S) : David C. Ruzek

It is certified that error appears in the above-identified patent and that said Letters Patent is hereby corrected as shown below:

```
Abstract, last line, for "retain" read --retail--.
Column 1, line 19, for "discolorant" read --discoloration--.
Column 4, line 50, for "retain" read --retail--.
Column 4, line 62, for "rest" read --test--.
Column 4, line 67, for "1/8" read --5/8--.
Column 5, line 5, for "1/8" read --5/8--.
Column 5, line 17, for "1/8" read --5/8--.
Column 5, line 38, for "1/8" read --5/8--.
Column 5, line 38, for "cops" read --chops--.
Column 5, line 39, for "tray" read --trays--.
Column 6, line 30, for "place" read --pale--.
Column 8, line 30, for "1/8" read --5/8--.
Column 8, line 33, for "temperating" read --tempering--.
Column 9, line 30, for "1/8" read --5/8--.
```

UNITED STATES PATENT AND TRADEMARK OFFICE
CERTIFICATE OF CORRECTION

PATENT NO. : 4,812,320

DATED : March 14, 1989

INVENTOR(S) : David C. Ruzek

It is certified that error appears in the above-identified patent and that said Letters Patent is hereby corrected as shown below:

```
Column 9, line 43, for "that" read --than--.
Column 10, line 52, for "conex" read --convex--.
Column 10, line 66, for "1/8" read --5/8--.
Column 11, line 10, for "89" read --90--.
Column 11, line 15, for "temperating" read --tempering--.
Column 11, line 23, for "temperating" read --tempering--.
Column 12, line 7, for "an" read --and--.
Column 12, lines 26-27, for "produce" read --product--.
```

Signed and Sealed this

Second Day of January, 1990

Attest:

JEFFREY M. SAMUELS

Attesting Officer    Acting Commissioner of Patents and Trademarks